April 20, 1948.  A. F. BUROFF  2,439,840
MACHINE FOR SLICING CHEESE, OR THE LIKE, IN VARIOUS SHAPES AND SIZES
Filed Dec. 10, 1945   5 Sheets-Sheet 1
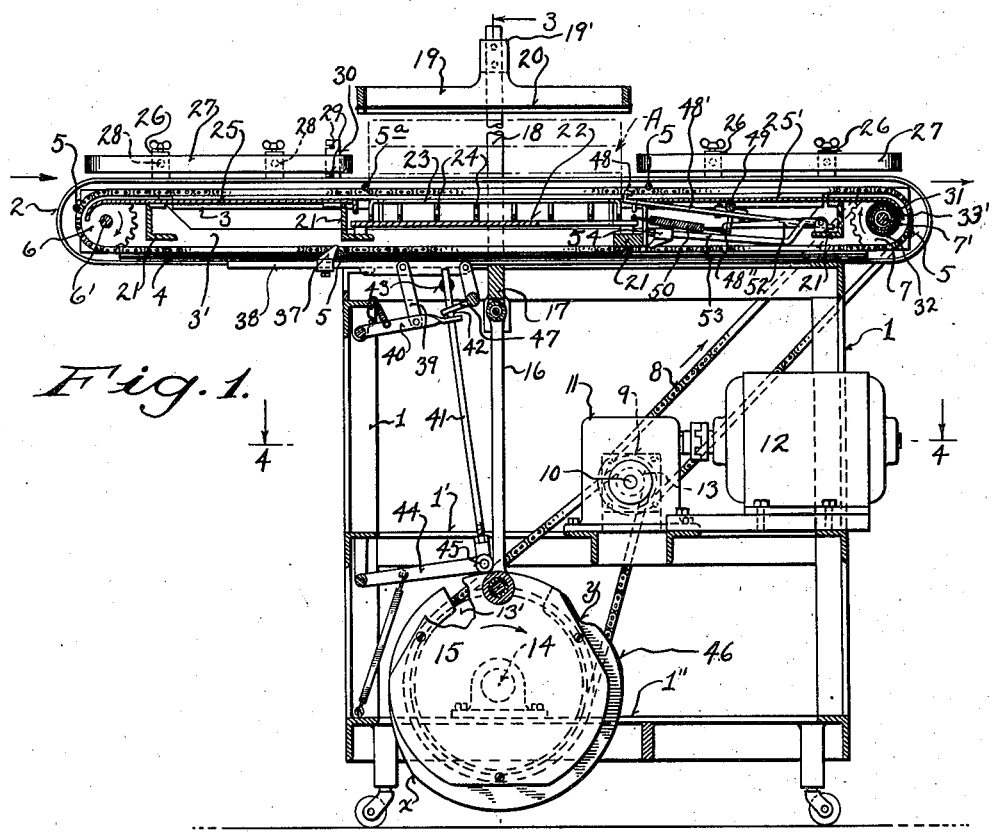
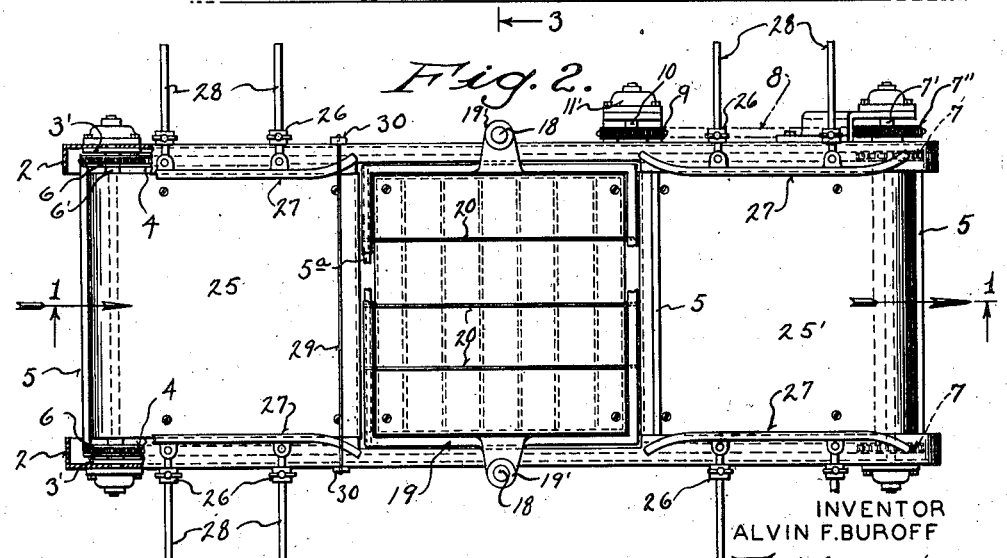
INVENTOR
ALVIN F. BUROFF
BY 
ATTORNEYS

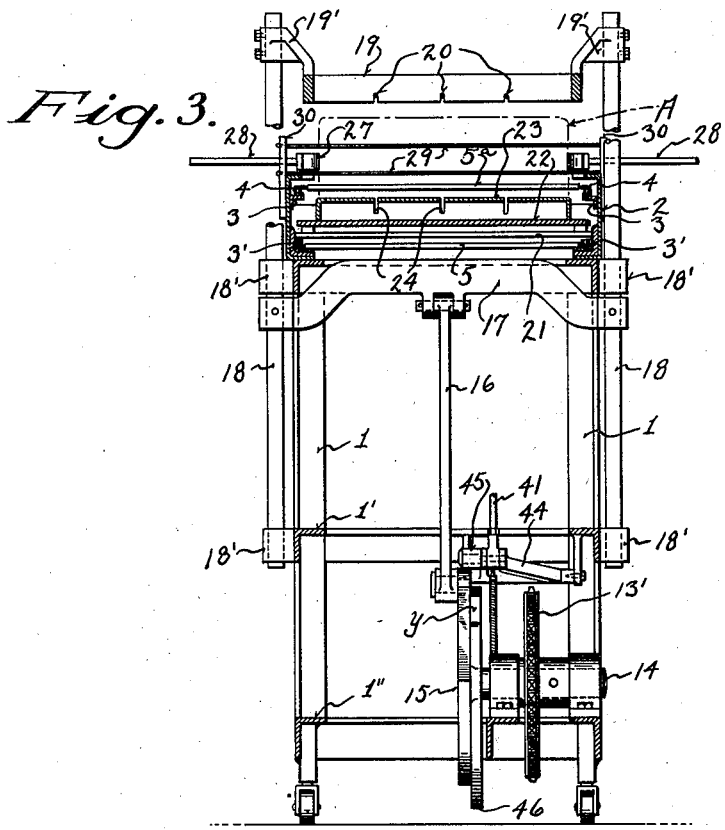
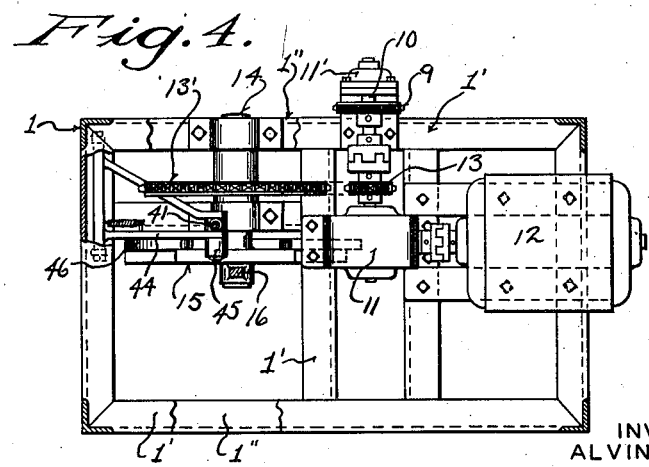

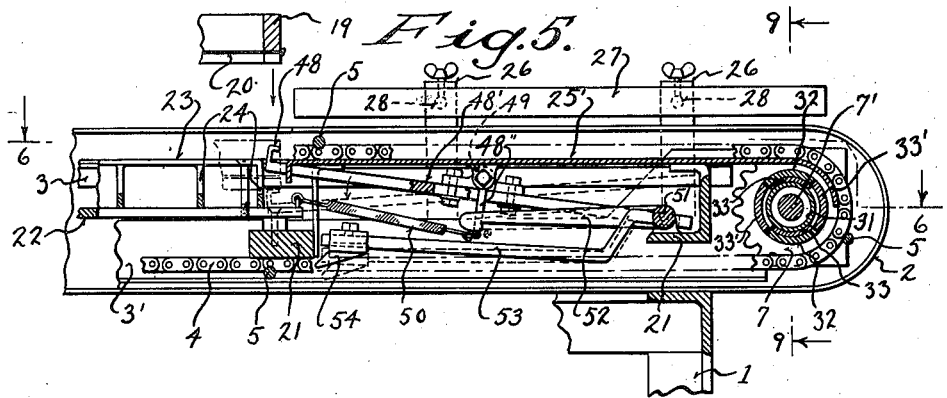
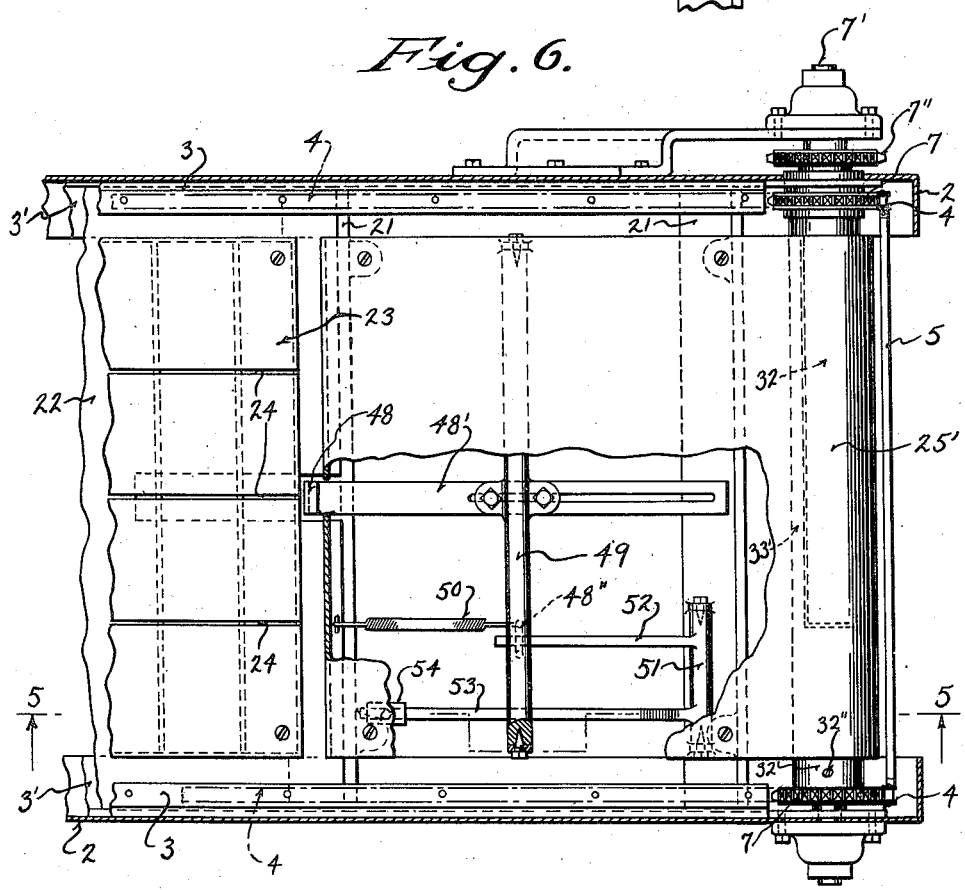
INVENTOR
ALVIN F. BUROFF
BY
ATTORNEYS

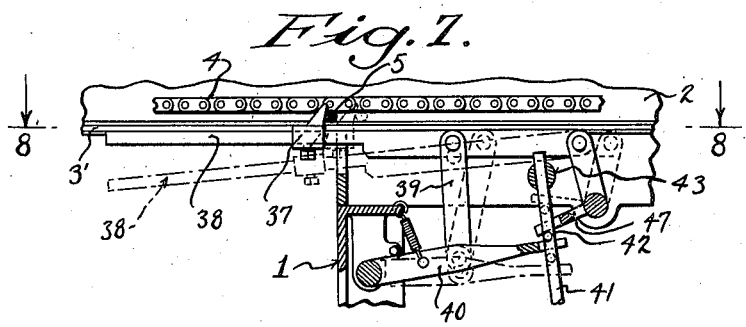
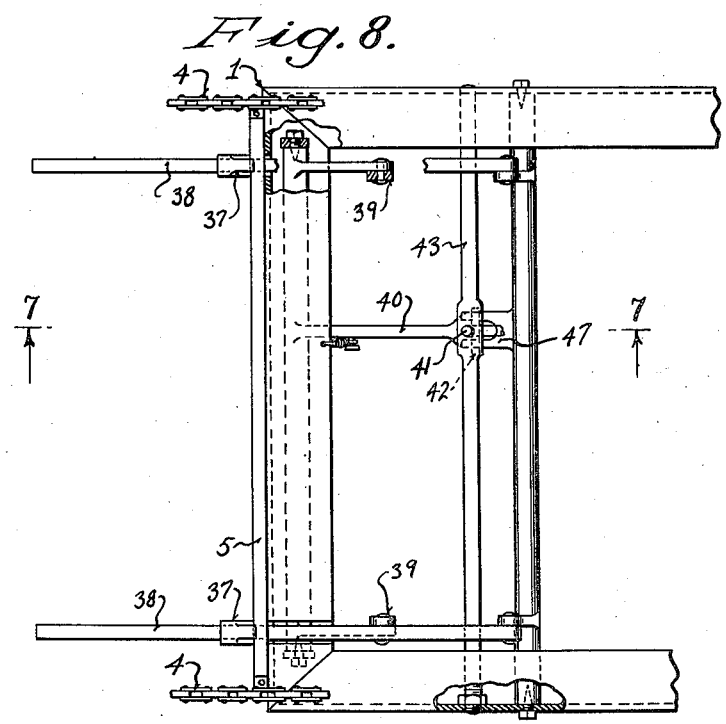
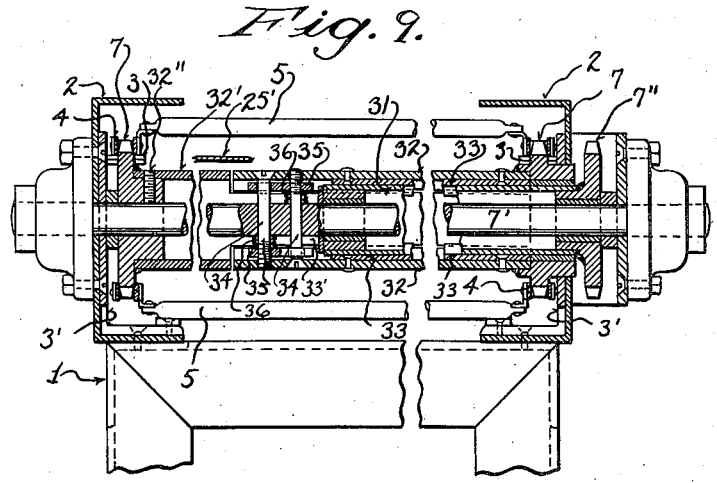

April 20, 1948. A. F. BUROFF 2,439,840
MACHINE FOR SLICING CHEESE, OR THE LIKE, IN VARIOUS SHAPES AND SIZES
Filed Dec. 10, 1945 5 Sheets-Sheet 5

INVENTOR
ALVIN F. BUROFF
BY
ATTORNEYS

Patented Apr. 20, 1948

2,439,840

UNITED STATES PATENT OFFICE 2,439,840

MACHINE FOR SLICING CHEESE OR THE LIKE IN VARIOUS SHAPES AND SIZES

Alvin F. Buroff, Columbus, Wis.

Application December 10, 1945, Serial No. 634,021

3 Claims. (Cl. 31—30)

My invention has for its primary object to provide a machine for cutting or slicing bulk cheese into a variety of pieces and sizes, the same being of that general type such as disclosed in my pending patent application, bearing Serial No. 612,149.

A further object of my invention is to provide a horizontally disposed fixed platen upon which is fed, step by step, a bulk cheese, followed by a downward reciprocation movement of a gang slicer or cutter, all actions being controlled by a combined crank driven pitman and cam mounted upon a driven shaft, the cheese being fed by flights of an endless chain travelling intermittently by means of clutch control.

A further specific object of my invention is to provide horizontally disposed fixed wire cutters positioned in the path of travel of a bulk cheese, whereby the same may be cut into thin layers as it travels towards the vertically reciprocative gang of slicing wires.

With the above and other objects in view, which will appear as the description proceeds, the invention resides in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Fig. 1 represents a sectional side elevation of a machine embodying the features of my invention, the section being indicated by line 1—1 of Fig. 2.

Fig. 2 is a plan view of the same.

Fig. 3 is a vertical section through the machine, the section being indicated by line 3—3 of Fig. 1.

Fig. 4 is a sectional plan view through the machine illustrating the driving mechanism thereof, the section being indicated by line 4—4 of Fig. 1.

Fig. 5 is an enlarged fragmental sectional view illustrating structural features of the cheese supporting frame and chain conveyor, the section being indicated by line 5—5 of Fig. 6.

Fig. 6 is a plan view of the same, partly in section, as indicated by line 6—6 of Fig. 5.

Fig. 7 is an enlarged fragmentary elevation illustrating the conveyor chain controlling mechanism in section, as indicated by line 7—7 of Fig. 8.

Fig. 8 is a plan view of the same, partly in section, as indicated by line 8—8 of Fig. 7.

Fig. 9 is a cross sectional view illustrating the frictional clutch mechanism and conveyor chain mechanism, the section being indicated by line 9—9 of Fig. 5.

Fig. 9a is a detail view of the telescopic clutch members disconnected, and

Figure 10:
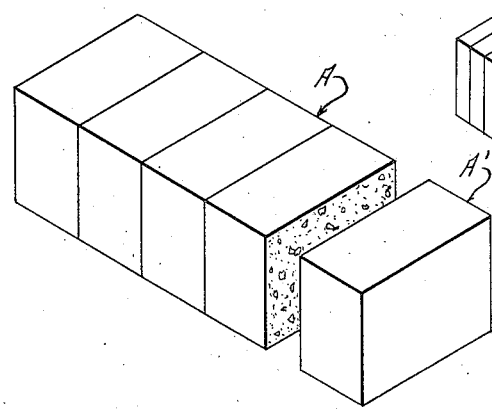
Figure 11:
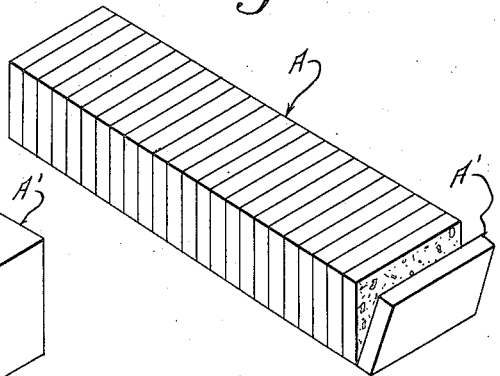
Figure 12:
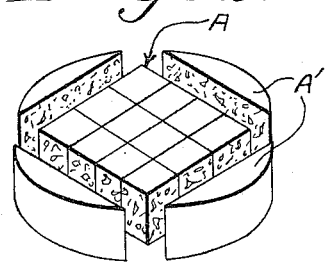
Figure 13:
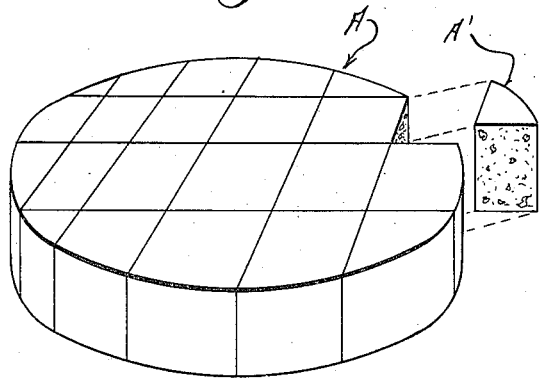

Figures 10 to 16 inclusive, illustrate blocks or bulk cheese in various designs, cut or sliced into different sized pieces by the machine.

Referring by characters to the drawings, with especial reference to Figures 1 to 4 inclusive, I indicates a skeleton frame having secured thereto U-shaped side panels 2, carrying angle iron tracks 3—3', upon which travels endless chains 4, connected by flight rods 5 spaced apart a sufficient distance for inserting a cheese therebetween, as indicated in dotted lines A.

The chains are trained over pairs of idle sprocket wheels 6 and driven sprocket wheels 7 mounted upon shafts 6' and 7' respectively, which shafts are journaled in the panels.

A sprocket wheel 7'', loosely mounted upon the shaft 7', is driven by a chain belt 8 from a sprocket wheel 9 mounted on a shaft 10 journaled in a reduction gear box 11 and a bearing 11', both of which are secured to the skeleton frame braces 1', forming part of the machine frame. The reduction gear train (not shown) in the gear box is driven by a motor 12, suitably mounted upon the frame.

The shaft 10 also carries a sprocket pinion 13, in chain belt connection with a sprocket wheel 13', which sprocket wheel is secured to a stud shaft 14 suitably journaled in a lower skeleton brace bracket 1'' of the frame.

The stud shaft 14 has mounted thereon a crank disc 15. The disc is connected, by a pitman 16, to a vertically reciprocative cross head 17. The cross head is secured to a pair of rods 18, which rods are reciprocatively guided in ears 18', carried by the frame. The upper ends of the rods are secured to a cutting head 19 having laterally extended ears 19', which are adjustably secured to the rods 18, as best indicated in Figures 1 and 3 of the drawings.

The cutter head 19 is of the skeleton frame type and has secured thereto a series of parallel cutting wires 20. The U-shaped panels 2 are connected by four transverse brace strips 21. The center pair of the brace strips have secured thereto a plate 22 in vertical alignment with the cutter head. This plate has secured thereto an edge flanged and transversely ribbed platen 23 and said platen is provided with slots 24, which slots are aligned with the cutting wires 20 of the cutter head, the same being adapted to enter said slots 24 when the head has reached its extreme downward position.

The front and rear pairs of the brace strips 21 have secured thereto bed-plates 25—25', upon the same horizontal plane as the platen 23 and, in effect, these bed-plates form an interrupted road-bed, whereby a cheese will travel from end to end thereon.

The panels are provided with pairs of upstanding ears 26, adjacent their ends, and said ears serve as adjustable supports for longitudinally positioned cheese guide rails 27, the same being provided with outwardly extended rods 28, which pass through the ears and are locked in their adjusted positions by thumb screws, as shown.

For the purpose of horizontally splitting a cheese, under certain conditions, I provide a pair of cutting wires 29, which wires are transversely disposed across and above the road bed and are secured to fingers 30 extending upwardly from the platen bed. It will be noted that the cutting wires are positioned just forward of the cutting head 19 to clear the same.

Under certain conditions in the operation of the machine, it is necessary to stop the chain and to reverse its feeding travel. Hence, I provide a friction clutch, adjustable as to tension, between the chain driving sprockets 7 and the power sprocket 7", particularly illustrated in Figures 1, 9 and 9a of the drawings.

The driving sprocket wheel 7" carries a sleeve 31 loosely mounted upon the shaft 7', which sleeve serves as a bearing for one of the chain sprocket wheels 7, adjacent to the driving sprocket wheel 7". The said sprocket wheel 7 has brazed, or otherwise secured, thereto a pair of sectors 32 and said sectors have riveted to their inner faces frictional lining plates 33, the same being engageable with the surface of the sprocket wheel sleeve 31.

The sector plates 32, in conjunction with similar sector plates 33', form a cylinder, when interlocked, it being understood that the cylinder 32' is brazed, or otherwise secured, to the hub of the chain sprocket 7, which sprocket is loosely mounted upon the shaft 7' opposite the power sprocket 7". Hence, when the interlocked sections of the cylinder 32' are assembled, they will rotate as a single element and the lining plates, which engage the sleeve 31, will frictionally grip the assemblage, causing the companion pair of sprocket wheels 7 to rotate together. Obviously when a predetermined load is placed upon the conveyor chains 4, the same will come to a full stop while the sleeve 31 will rotate idly, it being understood that the cylinder 32' is rigidly secured to the shaft 7' by the locking bolt 32".

In order to adjust and vary the tension load of this friction clutch mechanism, I provide a pair of oppositely disposed bolts 34—34, which bolts extend through the cylinder sectors 32 from opposite sides and are loosely rotatable in the apertures of said sectors. The ends of these bolts are in threaded engagement with a pair of links 35 having apertures loosely mounted upon the companion bolts. Coil springs 36 are interposed between the links and the shaft 7', through which the bolts also extend.

From the foregoing, it will be noted that when it is desired to vary the friction resistance between the lining plates 33 and the sleeve 31, the bolts are manipulated to vary the tension of the coil springs, whereby the slippage to retard or reverse travel of the chains is effected.

In order to stop the travel of the conveyor chain 4 in its cheese feeding course, as best shown in Figures 1, 7 and 8, I provide a pair of lugs 37 adjustably secured to arms 38, the said arms being connected by a link 39 to a spring controlled lever 40, pivoted to the frame. The said lever is forked at its free end, for the reception of a rod 41 having a pin 42 extending transversely of the forked lever and above the same. The rod 41 is guided at its upper end by an apertured bar 43, anchored in the frame sides.

The lower end of the rod 41 is pivotally connected to a spring controlled rock-arm 44, the same being provided at its free end with a roller 45, as best indicated in Figures 1 and 3 of the drawings. As shown, the rock-arm 44 is pivoted to ears extending from the frame. The rock-arm roller 45 is of sufficient length that, under certain conditions, it will engage the periphery of the disc 15, and when freed from such engagement, due to cut away portions of the disc, it will engage the periphery of a cam 46 carried by the disc, upon its rear face, for controlling the position of the stop lugs 37.

From the foregoing description, with reference to said stop lugs, it will be obvious when the disc 15 is rotated in the direction of the arrow, the high face $x$ of the cam will engage the roller 45 and cause the rock-arm, with its associated rod 41, to lift, whereby the rock-arm pin 42 will exert pressure upon the forked end of a bell-crank lever 47. The lever is pivoted to the frame, with its upper arm connected to an arm 38, whereby the pair of lugs 37, which are in the field of a flight rod 5, will cause the chain to move backwardly a short distance. In this movement the lever 40 will remain at rest and its link 39 will simply rock backward and forward.

It is apparent, in the continued rotation of the disc 15, the rock-arm roller 45 will, due to its spring tension, drop down into the pocket $y$ of the cam 46, in which position the pin 42, of the rod, will cause the lever and its link connection, to move downwardly, whereby the lugs 37, of the chain stop mechanism, will be drawn down clear of the flight rod 5, thus freeing the conveyor chain, whereby the friction clutch mechanism will cause the chain to travel in its forward feed direction.

When the flight rod 5a reaches the position shown in Fig. 1 of the drawings, it will have moved a cheese A, indicated in dotted lines, to a position in vertical central alignment with the cutting head 19.

To stop the cheese in its aligned position, with reference to the cutter head, I provide a central disposed stop finger 48, as best indicated in Figures 1, 5 and 6. The stop finger normally projects above and between the platen and bed-plate, whereby the rear edge of the cheese will abut the same.

A tail piece 48', of the stop finger, is slotted at its rear end and adjustably secured to a rocking stem 49, which stem is pivotally mounted in ears depending from the rear bed-plate 25'. A slotted arm 48" of this tail piece extends downwardly from the stem 49 and is connected by a coil spring 50, which, in turn, is anchored to the plate 22.

The rear angle iron cross piece 21 is provided with upstanding ears for pivotal connection with a hub 51 having a dog 52, extending therefrom, for engagement with the slotted arm 48". The opposite end of the hub 51 has extended therefrom a leg 53, which leg, at its free end, has adjustably mounted thereon a trip-lug 54, which lug is normally positioned above the line of travel of the flight rods 5.

When the stop finger 48 is in its normal position above the plane of travel of the cheese, as shown in Figure 5, the said stop finger is depressed, when the lower edge of the cutting or slicing head 19 engages said stop finger in its downward travel to slice a cheese. When so engaged, the finger is locked in its depressed position by the dog 52 and slotted arm 48". However, in this locked position, the trip-lug 54 is within the path of travel of the flight rods and when a flight rod engages the trip-lug, it will rock the leg 53, dog and stop-finger 48 upwardly, to its normal cheese stop position of rest, preparatory to engagement with the back edge of a cheese.

Figure 14:
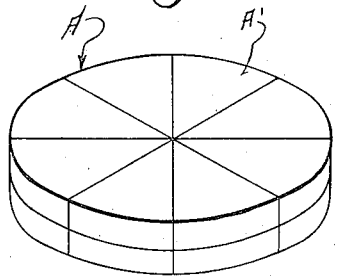
Figure 15:
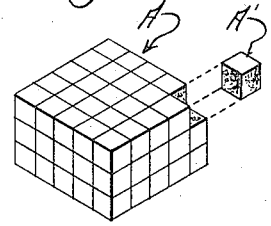
Figure 16:
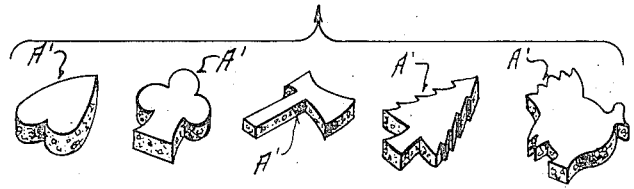

From the foregoing description, it will be noted that all mechanisms, with reference to feeding and slicing cheese, are adjustable or interchangeable, whereby different designs of cut or sizes may be varied, as indicated in Figures 10 to 16 of the drawings. For such variations, the head 19 will be interchangeable, to include variations in the design or arrangement of wire cutters, as, for example, when a round cheese is cut into radial wedges, as indicated in Fig. 14, the slicing wires will be arranged accordingly in the cutter head frame 19.

To accommodate various widths of cheeses, the rails 27 would be adjusted to guide the same and the stop finger 48 would also be adjusted to compensate for the size of a bulk cheese, also a platen plate 22 would be supplied to conform with the cutter head 19.

In the operation, a bulk cheese would be placed upon the bed-plate 25, at the feed end of the machine. A flight rod 5 would then engage the front wall of the cheese and slide it along the bed, until it reaches the center of the platen, at which point the cheese would be stopped by the finger 48. The conveyor chain would also come to rest, due to slippage of the friction clutch mechanism, mounted upon the shaft 7'. Referring particularly to Fig. 1 of the drawings, the slicing head 19 would then move downwardly, incidental to rotation of the crank disc 15, in the direction of the arrow.

When the cutting wires 20 have partly severed the cheese, a frame of the cutter head 19 will engage and depress the finger 48 to clear the surface of the bed, and said finger would be locked, in its depressed position, by the dog 52. The cutter head will then complete its downward movement, at which time the wrist pin connection of the disc 15 will be in its lowest position and the cutting wires will have entered the slots in the platen 32.

It will also be apparent that the flight rod 5a will be stopped in its position, due to the fact that the locking lug 37 has engaged the flight rod 5a and thus securely holds the conveyor against movement.

Prior to the depression of the stop finger 48, the flight rod 5a is cleared from the cheese A, whereby the head may complete its downward slicing movement and not engage said rod 5a. To accomplish this result, the cam track 46, indicated at the point x, will cause the rock-arm 44 to lift, whereby the bell-crank lever 47 will be engaged by the pin 42 of the rock-arm rod 41, and the arms 38, with associated lugs 37, will be moved towards the discharge end of the bed. This action will cause the lugs 37, which are in engagement with the flight rod 5, to move the lower strip of the chain end towards the friction clutch. By this action the flight rod 5a will make a slight backward movement, to thus clear the path of travel of the cutter head.

In order to feed the cut cheese to the rear end of the bed, the conveyor chain must now be released, whereby the rod 5a and friction clutch, will cause the severed cheese to slide rearwardly and be discharged, which movement is effected by the flight rod 5a again engaging and sliding said cheese rearwardly.

The chain release is accomplished by the rock-arm roller 45 dropping downwardly, as it travels over the depression in the cam track 46, indicated at the point y. This action causes the rod 41, asociated with the rock-arm, to move downwardly, whereby the pin 42, of said rod, will engage the lever 40 and, through its link connection, draw the arm 38, and its associated lug 37, downwardly to clear the path of travel of the flight rod 5.

When the cheese, in its discharge movement, has passed beyond the stop finger 48, the said stop finger is released from its depressed locked position by one of the flight rods 5, which engages the trip cam lug 54, as best indicated in Fig. 5 of the drawings. This lifting movement, upon the leg 53, will cause the dog 52 to be released from its engagement with the slotted arm 48", whereby the spring 50, associated with said arm, will permit the stop finger 48 to rise in its normal stop position, as shown.

Referring to Figures 10 to 16 inclusive, showing variations in the cut of the cheese A, wherein round cheeses are sliced in parallel blocks and segments, a cube cheese is sliced in both directions, and a round cheese is sliced in wedges. A' represents one of the individual cuts of cheese, which has been cut from a cheese A.

While I have disclosed a slicing head embodying a frame with wire cutters, in some instances I may employ knife blade cutters for the head, when the machine is to be used as a cake or bread slicing machine.

I claim:

1. A slicing machine for food products comprising a bed, a reciprocative slicing head above the bed, an endless conveyor having flights adapted to travel over the bed, a slip clutch driving means therefor, a movable stop finger projecting above the bed under control of the conveyor flights, a shiftable conveyor stop-lug, means for reversing the travel of the feed conveyor, and a cam for actuating the conveyor stop-lug and reversing means.

2. A cheese slicing machine comprising a horizontal bed-plate including a platen, a friction clutch controlled driven endless conveyor travelling over the bed-plate, flight rods secured to the conveyor, a vertically reciprocated cheese slicing head above the conveyor in alignment with the platen, a shiftable lock and release stop finger normally projecting above the bed-plate engageable with the slicing head frame to serve as a cheese centering device, means associated with the stop finger in the path of travel of the conveyor flights permitting release of the stop finger when engaged by a flight rod, lock and release means in the path of travel of the flight rods for stopping the conveyor when one of its rods confines a cheese between the same and the stop finger for alignment with the slicing head, means for feeding the endless conveyor in a reverse direction, and cam means for actuating the lock and release means and the feed reversing means of the conveyor.

3. A slicing machine for cheese, or the like, comprising a frame having horizontal side panels, bed-plates supported by the panels, a slotted platen supported by the panels between the bed-plates and upon the same horizontal plane thereof, front and rear shafts journaled in the ends of the panels, sprockets mounted upon the shafts, an endless conveyor chain carried thereby, transversely disposed flight rods carried by the conveyor, a drive sprocket mounted upon the rear shaft, a friction clutch connection between the drive sprocket and adjacent pair of conveyor sprockets, a stud shaft mounted in the frame, a cam faced disc and sprocket wheel secured thereto, a motor, a chain belt connection between the motor, stud shaft sprocket and friction clutch drive sprocket, a pair of vertically disposed connected rods reciprocatively mounted upon the frame, a cheese slicing head secured to the rods above the platen, a pitman connecting the slicing head rods and cam disc, a shiftable spring controlled stop finger extending above the rear bed-plate engageable with the slicing head frame, a lock and release mechanism associated with the stop finger in the path of travel of the conveyor flight rods, a stop and conveyor reverse travel mechanism engageable with the lower stretch conveyor flight rods, and a disc-cam actuating means for the stop and conveyor reverse travel mechanism.

ALVIN F. BUROFF.

REFERENCES CITED

The following references are of record in the file of this patent:

FOREIGN PATENTS

| Number | Country | Date |
|---|---|---|
| 7,313 | Great Britain | Mar. 23, 1914 |